US010225771B2

(12) United States Patent
Lakhdhar et al.

(10) Patent No.: US 10,225,771 B2
(45) Date of Patent: Mar. 5, 2019

(54) METHOD FOR CONTROLLING WIRELESS COMMUNICATION DEVICES WHEN OPERATING IN A WIRELESS COMMUNICATION NETWORK

(71) Applicant: BLACKBERRY LIMITED, Waterloo (CA)

(72) Inventors: Khaled Lakhdhar, Waterloo (CA); Lizhong Zhu, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 40 days.

(21) Appl. No.: 14/633,740

(22) Filed: Feb. 27, 2015

(65) Prior Publication Data
US 2016/0255549 A1 Sep. 1, 2016

(51) Int. Cl.
*H04W 4/00* (2018.01)
*H04W 36/00* (2009.01)
*H04W 24/10* (2009.01)
*H04W 36/08* (2009.01)

(52) U.S. Cl.
CPC ....... *H04W 36/0094* (2013.01); *H04W 24/10* (2013.01); *H04W 36/00837* (2018.08); *H04W 36/08* (2013.01)

(58) Field of Classification Search
CPC ............. H04W 24/10; H04W 36/0083; H04W 36/0094; H04W 36/08; H04W 36/14; H04W 48/16; H04W 48/18; H04W 24/00
USPC ..... 370/328, 331, 332, 338, 235; 455/432.1, 455/434, 436, 442, 418
See application file for complete search history.

(56) References Cited

U.S. PATENT DOCUMENTS

| 8,085,732 B2 | 12/2011 | Su et al. |
| 8,089,939 B1 | 1/2012 | Mater et al. |
| 2004/0246922 A1 | 12/2004 | Ruan et al. |

(Continued)

FOREIGN PATENT DOCUMENTS

EP 2789193 10/2014

OTHER PUBLICATIONS

International Search Report dated May 18, 2016 for International Application No. PCT/IB2016/051027.

(Continued)

*Primary Examiner* — Harun Chowdhury
(74) *Attorney, Agent, or Firm* — Perry + Currier Inc.

(57) ABSTRACT

A method of controlling a wireless communication device to dynamically adapt and update roaming parameters stored in the device when operating in a wireless network. The method includes: determining a first roaming metric ($M_1$) for a first wireless access point (AP) of the network when the device is in communication with the first AP; determining a second roaming metric ($M_2$) for a second wireless AP of the network when the device has roamed to the second AP; and determining an adaptation value by subtracting $M_2$ from $M_1$. When the adaptation value is not zero, first roaming parameters associated with the first wireless AP are updated, based on the adaptation value and stored first roaming parameters associated with the first wireless AP and second roaming parameters associated with the second wireless AP are updated based on the adaptation value and stored second roaming parameters associated with the second wireless AP.

12 Claims, 5 Drawing Sheets

(56) References Cited

U.S. PATENT DOCUMENTS

| | | | |
|---|---|---|---|
| 2006/0067226 A1* | 3/2006 | Chandra | H04W 24/00 |
| | | | 370/235 |
| 2007/0232307 A1 | 10/2007 | Ibrahim et al. | |
| 2008/0293405 A1* | 11/2008 | Meyer | H04W 48/18 |
| | | | 455/432.1 |
| 2010/0097982 A1* | 4/2010 | Eichenberger | H04W 36/08 |
| | | | 370/328 |
| 2012/0170474 A1 | 7/2012 | Pekarske | |
| 2013/0150012 A1* | 6/2013 | Chhabra | H04W 48/16 |
| | | | 455/418 |

OTHER PUBLICATIONS

Written Opinion dated May 18, 2016 for International Application No. PCT/IB2016/051027.
Extended European Search Report, dated Jan. 3, 2018, by EPO, re European Patent Application No. 16754847.8.

* cited by examiner

"LABCONNECT": 2 APs

64:00:F1:13:08:90
Noise
Counter
Rel_rnk
Abs_rnk
Roam_trig
Roam_delta

| | | | | | | | | | | | | | |
|---|---|---|---|---|---|---|---|---|---|---|---|---|---|
| -85.0 | -82.1 | -79.2 | -76.2 | -73.3 | -70.4 | -67.5 | -64.6 | -61.7 | -58.8 | -55.8 | -52.9 | -50.0 | |
| -98.2 | -98.0 | -98.0 | -97.0 | -98.1 | -98.1 | 98.0 | -0.0 | -98.0 | -98.0 | -98.0 | -98.0 | -0.0 | |
| 0.73 | 0.75 | 0.76 | 0.78 | 0.82 | 0.83 | 0.86 | | 0.89 | 0.92 | | 0.96 | | |
| 0.4 | 0.5 | 0.5 | 0.5 | 0 | 0 | 0 | 0 | 0 | 0 | 0 | 0.5 | 0 | |
| -69 | -69 | -69 | -69 | -69 | -70 | -70 | -70 | -70 | -70 | -70 | -70 | -70 | |
| 0 | 0 | 0 | 0 | 0 | 10 | 10 | 10 | 10 | 10 | 10 | 10 | 10 | |

C4:71:FE:DC:B3:90
Noise
Counter
Rel_rnk
Abs_rnk
Roam_trig
Roam_delta

| | | | | | | | | | | | | | |
|---|---|---|---|---|---|---|---|---|---|---|---|---|---|
| -85.0 | -82.1 | -79.2 | -76.2 | -73.3 | -70.4 | -67.5 | -64.6 | -61.7 | -58.8 | -55.8 | | -50.0 | |
| -98.0 | -97.2 | -97.4 | -98.0 | -98.0 | -98.1 | -0.0 | -0.0 | -0.0 | -98.0 | -98.0 | -98.0 | -0.0 | |
| 0.75 | | | | | | | | | | | | | |
| 0.5 | 0.5 | 0.5 | 0.5 | 0 | 0.84 | 0 | 0 | 0 | 0.91 | 0.94 | | 0.96 | |
| -69 | -69 | -69 | -69 | -69 | -70 | -70 | -70 | -70 | -70 | -70 | -70 | -70 | |
| 0 | 0 | 0 | 0 | 0 | 10 | 10 | 10 | 10 | 10 | 10 | 10 | 10 | |

FIG. 5A

"RFLABCONNECT": 2 APs

C4:71:FE:DC:B3:90
Noise
Counter
Rel_rnk
Abs_rnk
Roam_trig
Roam_delta

| | | | | | | | | | | | | | |
|---|---|---|---|---|---|---|---|---|---|---|---|---|---|
| -85.0 | -82.1 | -79.2 | -76.2 | -73.3 | -70.4 | -67.5 | -64.6 | -61.7 | -58.8 | -55.8 | | -50.0 | |
| -0.0 | -0.0 | -0.0 | -0.0 | -0 | -97.2 | -94.0 | -94.0 | -93.0 | -93.0 | -93.0 | -93.0 | -0.0 | |
| 0 | 0 | 0 | 0.77 | 0.81 | 0.71 | 0.75 | 0.78 | 0.78 | 0.5 | 0.82 | | 0.85 | |
| 0 | 0 | 0 | 0 | 0.5 | 0.7 | 0.5 | 0.5 | 0 | 0 | 0 | 0.5 | 0 | |
| -70 | -70 | -70 | -70 | -70 | -70 | -60 | -60 | -60 | -70 | -70 | -70 | -70 | |
| 10 | 10 | 10 | 10 | 0 | 0 | 0 | 0 | 0 | 10 | 10 | 10 | 10 | |

64:00:F1:13:08:90
Noise
Counter
Rel_rnk
Abs_rnk
Roam_trig
Roam_delta

| | | | | | | | | | | | | | |
|---|---|---|---|---|---|---|---|---|---|---|---|---|---|
| -85.0 | -82.1 | -79.2 | -76.2 | -73.3 | -70.4 | -67.5 | -64.6 | -61.7 | -58.8 | -55.8 | -52.9 | -50.0 | |
| -0.0 | -0.0 | -0.0 | -97.2 | 98.0 | -98.0 | -98.0 | -98.0 | -98.0 | -0.0 | -98.0 | -98.0 | -0.0 | |
| 0 | 0 | 0 | 0 | 0.81 | 0.84 | 0.85 | 0.87 | 0.89 | 0 | 0.93 | 0.96 | | |
| 0 | 0 | 0 | 0.5 | 0.5 | 0.5 | 0.5 | 0.5 | 0 | 0 | 0.5 | 0.5 | 0 | |
| -70 | -70 | -70 | -70 | -70 | -70 | -70 | -70 | -70 | -70 | -70 | -70 | -70 | |
| 10 | 10 | 10 | 10 | 0.7 | 0.7 | 0.7 | 0.7 | 0 | 10 | 10 | 10 | 10 | |

FIG. 5B

METHOD FOR CONTROLLING WIRELESS COMMUNICATION DEVICES WHEN OPERATING IN A WIRELESS COMMUNICATION NETWORK

FIELD

The present specification relates generally to wireless communication devices when operating in wireless communication networks, and specifically to a method of controlling a wireless communication device to dynamically adapt and update roaming parameters stored in the device when operating in a wireless communication network.

BACKGROUND

Wireless communication devices, such as mobile devices, smartphones, personal digital assistants (PDAs), and laptop computers, may be configured to communicate with wireless communication networks. Such devices may, for example, communicate via access points (APs) of wireless local area networks (WLANs) in accordance with Institute of Electrical and Electronics Engineers (IEEE) 802.11 standards or the like. Wireless communication devices may communicate with WLANs which are private WLANs of an enterprise or public WLANs such as hotspots. When a wireless communication device operates within a wireless communication network, such as, for example, a WLAN, and communicates with access points (APs) of the wireless communication network, the wireless communication device monitors a radio signal strength indicator (RSSI) from the APs. As the wireless communication device moves within the wireless communication network, the wireless communication device can move outside the range of an AP of the wireless communication network, which causes the wireless communication device to sense a decrease in RSSI from the AP. When the RSSI monitored by the wireless communication devices falls below a threshold value, the wireless communication device roams to another AP of the wireless communication network and establishes communication therewith. Known methods of controlling wireless communication devices operating in wireless communication networks generally only consider the RSSI when determining whether to roam to another AP of the wireless communication network.

BRIEF DESCRIPTIONS OF THE DRAWINGS

For a better understanding of the various implementations described herein and to show more clearly how they may be carried into effect, reference will now be made, by way of example only, to the accompanying drawings in which:

FIGS. 5A and 5B are tables illustrating the results for the method of the present specification implemented on a wireless communication device operating in a wireless communication network.

DETAILED DESCRIPTION

Figure 1:
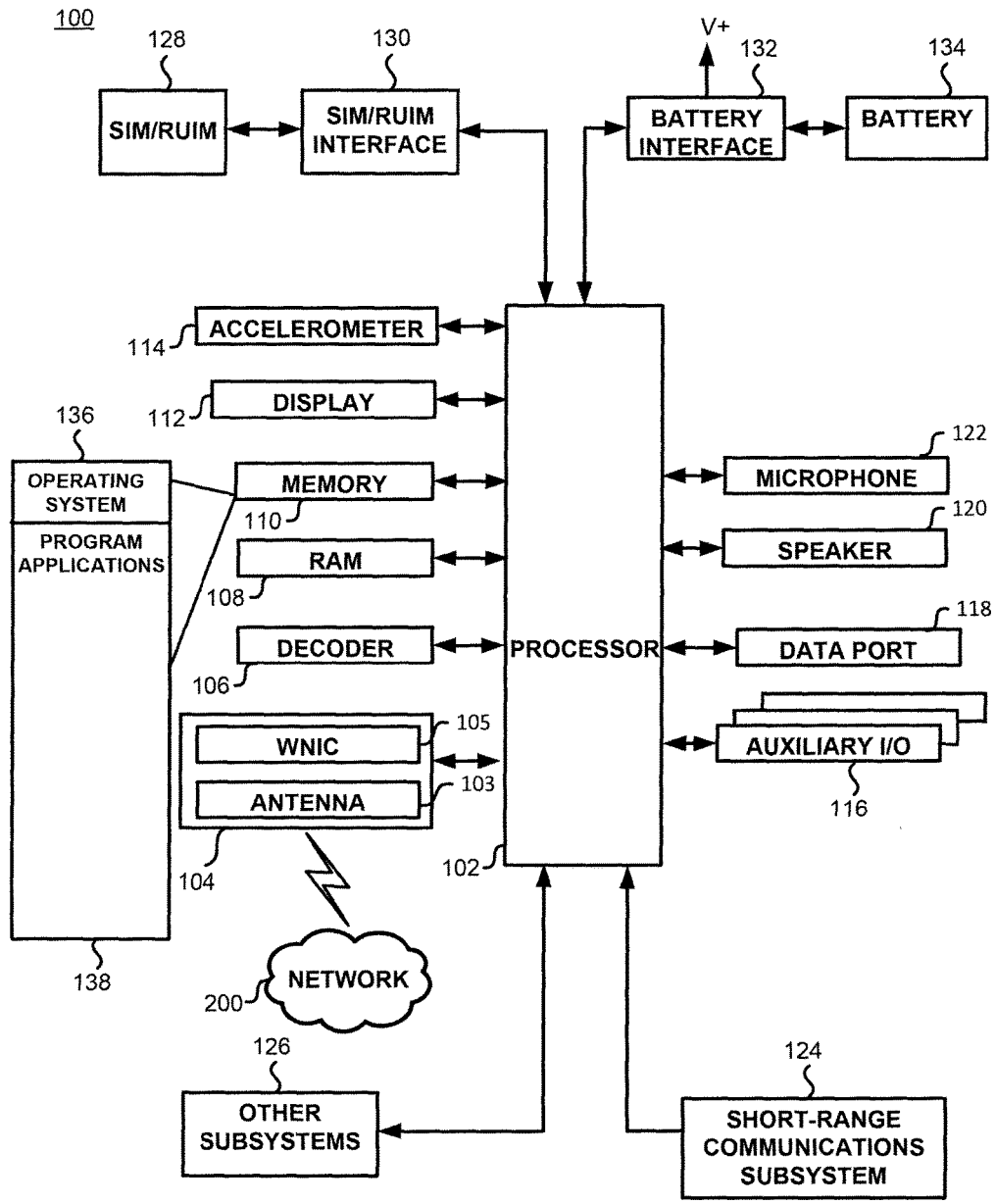
FIG. 1 is a block diagram of a wireless communication device in accordance with an example implementation of the present specification.

An aspect of the present specification provides a wireless communication device that includes an antenna and a wireless network interface controller (WNIC) for transmitting and receiving, via the antenna, radio frequency (RF) signals to and from access points of a wireless communication network; a memory storing roaming parameters associated with each respective one of the APs in the wireless communication network; and a processor operably coupled to the wireless network interface controller and the memory. The processor is configured to: (a) determine a first roaming metric ($M_1$) for the first wireless when the wireless communication device is in communication with the first wireless AP; (b) determine a second roaming metric ($M_2$) for a second wireless AP of the wireless communication network when the device roams to the second wireless AP; and (c) determine an adaptation value by subtracting the $M_2$ from the $M_1$. The processor is further configured to: (d) update first roaming parameters associated with the first wireless AP based on the adaptation value and stored first roaming parameters associated with the first wireless AP and update second roaming parameters associated with the second wireless AP based on the adaptation value and stored second roaming parameters associated with the second wireless AP.

According to another aspect of the present specification, the processor may be further configured to: (e) swap the first roaming parameters and $M_1$ associated with the first wireless AP with the second roaming parameters and $M_2$ associated with the second wireless AP, respectively; (f) designate the second wireless AP as the first wireless AP; and, (g) repeat (b) through (f).

According to another aspect of the present specification, the processor may be configured to determine $M_1$ based on a first double average value of a first radio strength indicator (RSSI) and a first double average value of a first in-phase and quadrature (IQ) noise for the first wireless AP, and determine $M_2$ based on a second double average value of a second radio strength indicator (RSSI) and a second double average value of a second in-phase and quadrature (IQ) noise for the second wireless AP.

According to another aspect of the present specification, the processor may be further configured to: determine $M_1$ by: (i) measuring, for a pre-selected time period, a discrete first set of samples of a first radio signal strength indicator (RSSI) and a first in-phase and quadrature (IQ) noise for the first wireless AP; (ii) determining a first average value of the first RSSI and a first average value of the first IQ noise from the discrete first set of samples captured over a pre-selected time period; (iii) repeating (i) and (ii) for a pre-selected number of realizations to obtain the first double average of the first RSSI and the first double average of the first IQ noise; and (iv) combining the first double average of the RSSI and the first double average of the IQ noise using a selected constant to form $M_1$ and determine $M_2$ by: (v) measuring, for a pre-selected time period, a discrete second set of samples of a second radio signal strength indicator (RSSI) and a second in-phase and quadrature (IQ) noise for the second wireless AP; (vi) determining a second average value of the second RSSI and a second average value of the second IQ noise from the discrete second set of samples captured over a pre-selected time period; (vii) repeating (v)

and (vi) for a pre-selected number of realizations to obtain the second double average of the second RSSI and the second double average of the second IQ noise; and (vii) combining the second double average of the RSSI and the second double average of the IQ noise using a selected constant to form $M_2$.

According to another aspect of the present specification, the first roaming parameters associated with first wireless AP include a first roam trigger parameter and a first roam delta parameter, the second roaming parameters associated with the second wireless AP include a second roam trigger parameter and a second roam delta parameter. The processor may be further configured to: update the first roaming parameters associated with the first wireless AP by setting the first roam delta parameter to a difference between the second roam trigger parameter and the first roam trigger parameter and by setting the first roam trigger parameter to a sum of the first roam trigger parameter and the adaptation value multiplied by 3 db; and update the second roaming parameters associated with the second wireless AP by setting the second roam delta parameter to a negative value of the first roam delta parameter and by setting the second roam trigger parameter to a difference between the second roam trigger parameter and the adaptation value multiplied by 3 db.

According to another aspect of the present specification, $M_1$ may be determined according to:

$$M_1 = \frac{1}{N_w} \sum_{N_w} \left[ \frac{1}{N_t} \sum_{N_t} \alpha \times \text{Normalized } IQ \text{ noise}(w, t) + (1 - \alpha) \times \text{Normalized } RSSI(w, t) \right]$$

wherein $0 \leq M_1 \leq 1$, $0 \leq \alpha \leq 1$, $N_t$ is a number of discrete measurements over a pre-selected time period, $N_w$ is a number of pre-selected observations or realizations, notation (w,t) designates a discrete time sample index t and a realization number index w of each measurement; and $M_2$ may be determined according to:

$$M_2 = \frac{1}{N_w} \sum_{N_w} \left[ \frac{1}{N_t} \sum_{N_t} \alpha \times \text{Normalized } IQ \text{ noise}(w, t) + (1 - \alpha) \times \text{Normalized } RSSI(w, t) \right]$$

wherein $0 \leq M_2 \leq 1$, $0 \leq \alpha \leq 1$, $N_t$ is a number of discrete measurements over a pre-selected time period, $N_w$ is a number of pre-selected observations or realizations, and notation (w,t) designates a discrete time sample index t and a realization number index w of each measurement.

According to another aspect of the present specification, the processor may be further configured to: prior to determining that the device has roamed to the second wireless AP in the wireless communication network, periodically update $M_1$ by summing a current value for the first roaming metric $(M_{1t1})$ multiplied by a forgetting factor (f) and a previous value for the first roaming metric $(M_{1t0})$ multiplied by (1−f), wherein $0 \mathrel{<}= f \mathrel{<}= 1$; and to adjust the forgetting factor (f) at each update of the $M_1$ by a factor equal to $2*(f−0.5)$ times a difference between the previous value of the first roaming metric $(M_{1t0})$ and the current value of the first roaming metric $(M_{1t1})$ when an absolute value of this factor is larger than a predetermined constant.

According to another aspect of the present specification, the processor may be further configured to: prior to determining that the adaptation value is not equal to zero, periodically update $M_2$ by summing a current value for the second roaming metric $(M_{2t1})$ multiplied by the forgetting factor (f) and a previous value for the first roaming metric $(M_{2t0})$ multiplied by (1−f); and to adjust the forgetting factor (f) at each update of the $M_2$ by a factor equal to $2*(f−0.5)$ times a difference between the previous value of the second roaming metric $(M_{1t1})$ and the current value of the second roaming metric $(M_{1t0})$ when an absolute value of this factor is larger than a predetermined constant.

According to another aspect of the present specification, the processor is further configured to determine that the device has roamed to a second wireless AP in the wireless communication network by determining that a roaming condition has been met. The roaming condition is determined to be met when the RSSI for the first wireless AP is less than or equal to a scan trigger threshold and the RSSI for the first wireless AP is less than the value of the first roam trigger parameter and a RSSI for the second wireless AP is greater than the sum of the RSSI of the first wireless AP and the first roam delta parameter.

According to another aspect of an implementation, the present specification provides, a method of controlling a wireless communication device to dynamically update roaming parameters associated with each respective one of a plurality of APs in the wireless communication network that are stored in a memory of the wireless communication device when the wireless communication device is operating in the wireless communication network, the method comprising: at a processor of the wireless communication device: (a) determining a first roaming metric $(M_1)$ for a first wireless AP of the wireless communication network when the wireless communication device is in communication with the first wireless AP; (b) determining a second roaming metric $(M_2)$ for a second wireless AP of the wireless communication network when the wireless communication device roams to the second wireless AP; (c) determining an adaptation value by subtracting the $M_2$ from the $M_1$; and (d) in response to determining that the adaptation value is not equal to zero, updating first roaming parameters associated with the first wireless AP based on the adaptation value and stored first roaming parameters associated with the first wireless AP and updating second roaming parameters associated with the second wireless AP based on the adaptation value and stored second roaming parameters associated with the second wireless AP.

According to another aspect of an implementation, the present specification provides a computer-readable medium storing a computer program, wherein execution of the computer program is for controlling a wireless communication device to dynamically update roaming parameters associated with each respective one of a plurality of APs in the wireless communication network that are stored in a memory of the wireless communication device when the wireless communication device is operating in the wireless communication network, the method comprising: (a) determining a first roaming metric $(M_1)$ for a first wireless AP of the wireless communication network when the wireless communication device is in communication with the first wireless AP; (b) determining a second roaming metric $(M_2)$ for a second wireless AP of the wireless communication network when the wireless communication device has roamed to the second wireless AP; (c) determining an adaptation value by subtracting the $M_2$ from the $M_1$; and (d) in response to determining that the adaptation value is not equal to zero, updating first roaming parameters associated with the first wireless AP based on the adaptation value and stored first roaming parameters associated with the first wireless AP and updating second roaming parameters associated with the second wireless AP based on the adaptation value and stored second roaming parameters associated with the second wireless AP.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

For simplicity and clarity of illustration, reference numerals may be repeated among the figures to indicate corresponding or analogous elements. Numerous details are set forth to provide an understanding of the implementations described herein. The implementations may be practiced without these details. In other instances, well-known methods, procedures, and components have not been described in detail to avoid obscuring the implementations described. The specification is not to be considered as limited to the scope of the implementations described herein.

The specification generally relates to an electronic device, which in the implementation described herein is a mobile or handheld, wireless communication device. Examples of mobile or handheld, wireless communication devices include smartphones, wireless organizers, personal digital assistants (PDAs), wirelessly enabled notebook computers, tablet computers, laptop computers, e-readers, and the like.

The Wireless communication device may be a two-way communication device with advanced data communication capabilities including the capability to communicate with other wireless communication devices or computer systems through a network of transceiver stations. Wireless communication device may also have the capability to allow voice communication. Depending on the functionality provided by the wireless communication device, it may be referred to as a data messaging device, a cellular telephone with data messaging capabilities, a wireless Internet appliance, or a data communication device (with or without telephony capabilities).

A block diagram of an example implementation of a wireless communication device 100 is shown in FIG. 1. Wireless communications device 100 includes multiple components, such as a processor 102 that controls the overall operation of wireless communications device 100. Communication functions, including data and voice communications, are performed through a communication subsystem 104 of wireless communication device 100. Communication subsystem 104 includes at least one antenna 103 and a wireless communication network interface controller (WNIC) 105 for performing voice and data communications. Data received by wireless electronic device 100 can be decompressed and decrypted by a decoder 106 of wireless communications device 100, operating according to any suitable decompression techniques (e.g. Yang-Kieffer (YK) decompression, and other known techniques) and encryption techniques (e.g. using an encryption technique such as Data Encryption Standard (DES), Triple DES, or Advanced Encryption Standard (AES)). Communication subsystem 104 receives messages from and sends messages to a wireless network 200. In this example implementation of wireless communication device 100, communication subsystem 104 is configured in accordance with the Global System for Mobile Communication (GSM) and General Packet Radio Services (GPRS) standards. GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the implementations described herein are intended to use any other suitable standards that are developed in the future. The wireless link connecting communication subsystem 104 with wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although wireless network 200 associated with wireless communications device 100 includes both a GSM/GPRS wireless communications network and WLAN 300 in the example implementation, other wireless networks may also be associated with wireless communications device 100 in variant implementations. The different types of wireless networks that may be employed include, for example, data-centric networks, voice-centric networks and dual-mode networks that can support both voice and data communications over the same physical base stations. Examples of dual-mode networks that can support both voice and data communications over the same physical base stations include, but are not limited to, Code Division Multiple Access (CDMA) or CDMA2000 networks, GSM/GPRS networks (as mentioned above), third-generation (3G) networks such as EDGE and UMTS, and fourth-generation (4G) networks such as Long Term Evolution (LTE) networks. Examples of data-centric networks include wired local area networks (LANs), WiMax networks, and packet-switch data networks, such as, for example, Mobitex™ and DataTAC™. Examples of voice-centric data networks include Personal Communication Systems (PCS) networks like GSM and Time Division Multiple Access (TDMA) systems.

Processor 102 is coupled to and interacts with other components, such as Random Access Memory (RAM) 108, memory 110, a touchscreen display 112. Touchscreen display 112 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay. The overlay may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

Processor 102 interacts with touchscreen display 112 via an electronic controller (not shown) of touchscreen display 112 to display or render a graphical user interface (GUI) that includes information, such as text, characters, symbols, icons, and other items. Processor 102 may also interact with an orientation sensor, such as accelerometer 114, to detect direction of gravitational forces or gravity-induced reaction forces, for example, to determine the orientation of wireless communication device 100. Processor 102 may include a single processor or multiple processors.

Processor 102 is also coupled to and interacts with an auxiliary input/output (I/O) subsystem 116, a data port 118, a speaker 120, a microphone 122, short-range communications subsystem 124, and other device subsystems 126.

Wireless communication device 100 can send and receive communication signals over wireless network 200 after network registration or activation procedures have been completed. Network access is associated with a subscriber or user of wireless communication device 100. To identify a subscriber according to the present implementation, wireless communication device 100 uses a SIM/RUIM card 128 (i.e. Subscriber Identity Module or a Removable User Identity Module) inserted into a SIM/RUIM interface 130 for communication with a network such as wireless network 200. SIM/RUIM card 128 is one type of a conventional "smart card" that can be used to identify a subscriber of wireless communication device 100 and to personalize the wireless communication device 100, among other things. In the present implementation, wireless communication device 100 is not fully operational for communication with wireless network 200 without SIM/RUIM card 128. By inserting SIM/RUIM card 128 into SIM/RUIM interface 130, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. SIM/RUIM card 128 includes a processor and memory for storing information. Once SIM/RUIM card 128 is inserted into SIM/RUIM interface 130, it is coupled to processor 102. In order to identify the subscriber, SIM/RUIM card 128 can include some user parameters such as an International Mobile Subscriber Identity (IMSI). When using SIM/RUIM card 128 a subscriber is not necessarily bound by any single physical wireless communication device. SIM/RUIM card 128 may store additional subscriber information for wireless communication device as well, including datebook (or calendar) information and recent call information. Alternatively, user identification information can also be programmed into memory 110.

Wireless communications device 100 includes a battery interface 132 for receiving one or more rechargeable batteries 134. In at least some implementations, battery 134 can be, for example, a smart battery with an embedded microprocessor. Battery interface 132 is coupled to a regulator (not shown), which assists battery 134 in providing power V+ to the components of wireless communication device 100. Although current technology makes use of a battery, future technologies such as micro fuel cells may provide power to wireless communication electronic device 100.

Optionally, wireless communications device 100 may also include a port (not shown) to an external power supply and a power adaptor (not shown), such as an alternating current to direct current (AC-to-DC) adaptor, that provides power to the components of wireless communications device 100.

Wireless communications device 100 also includes an operating system 136 and software programs or applications 138 which are described in more detail below. Operating system 136 and software programs or applications 138 that are executed by processor 102 are typically stored in a persistent store such as memory 110, which may be a flash memory, a read-only memory (ROM), or similar storage element (not shown). Those skilled in the art will appreciate that portions of operating system 136 and software programs or applications 138, such as specific device applications, or parts thereof, may be temporarily loaded into a volatile store such as RAM 108. Other software programs can also be included, as is well known to those skilled in the art.

Software programs or applications 138 control basic device operations, including data and voice communication applications, will normally be installed on the wireless communication during its manufacture. Other software programs or applications include a message application (not shown) that can be any suitable software program that allows a user of wireless communication device 100 to send and receive electronic messages. Various alternatives exist for the message application (not shown) as is well known to those skilled in the art. Messages that have been sent or received by the user are typically stored in memory 110 of wireless communication device 100 or some other suitable storage element in wireless communication device 100. In at least some implementations, some of the sent and received messages may be stored remotely from wireless communication device 100 such as in a data store of an associated host system that wireless communication device 100 communicates with.

Software applications 138 can further include a device state application (not shown), a Personal Information Manager (PIM) application (not shown), and other suitable applications (not shown). The device state application provides persistence, i.e. the device state application ensures that important device data is stored in persistent memory, such as memory 110, so that the data is not lost when wireless communication device 100 is turned off or loses power.

PIM application includes functionality for organizing and managing data items of interest to the user, such as, but not limited to, e-mail, contacts, calendar events, voice mails, appointments, and task items. PIM application has the ability to send and receive data items via wireless network 200. PIM data items may be seamlessly integrated, synchronized, and updated via the wireless network 200 with wireless communication device 100 subscriber's corresponding data items stored and/or associated with a host computer system. This functionality creates a mirrored host computer on wireless communication device 100 with respect to such items. This can be particularly advantageous when the host computer system is the portable electronic device subscriber's office computer system.

Wireless communication device 100 also includes a connect application (not shown), and an information technology (IT) policy application (not shown). Connect application implements the communication protocols that are required for wireless communication device 100 to communicate with the wireless infrastructure and any host system, such as an enterprise system, that the wireless communication device 100 is authorized to interface with.

Connect application includes a set of application program interfaces (APIs) that can be integrated with wireless communication device 100 to allow wireless communication device 100 to use any number of services associated with the enterprise system. Connect application allows wireless communication device 100 to establish an end-to-end secure, authenticated communication pipe with the host system. A subset of applications for which access is provided by the connect application can be used to pass IT policy commands from the host system to wireless electronic device 100. This can be done in a wireless or wired manner. These instructions can then be passed to the IT policy application to modify the configuration of wireless communication device 100. Alternatively, in some cases, the IT policy update can also be done over a wired connection.

Other types of software applications can also be installed on wireless communication device 100. These software applications can be third party applications, which are added after the manufacture of wireless communication device 100. Examples of third party applications include games, calculators, utilities, etc.

Additional applications can be loaded onto the wireless communication device 100 through at least one of wireless network 200, auxiliary I/O subsystem 116, data port 118, short-range communications subsystem 124, or any other suitable device subsystem 126. This flexibility in application installation increases the functionality of wireless communication device 100 and may provide enhanced on-device functions, communication-related functions, or both. For example, secure communication applications may enable electronic commerce functions and other such financial transactions to be performed using wireless communication device 100.

Data port 118 enables a subscriber to set preferences through an external device or software application and extends the capabilities of wireless communication device 100 by providing for information or software downloads to wireless communication device 100 other than through a wireless communication network. The alternate download path may, for example, be used to load an encryption key onto wireless communication device 100 through a direct and thus reliable and trusted connection to provide secure device communication.

Data port 118 can be any suitable port that enables data communication between wireless communication device 100 and another computing device. Data port 118 can be a serial or a parallel port. In some implementations, data port 118 can be a USB port that includes data lines for data transfer and a supply line that can provide a charging current to charge battery 134 of wireless communication device 100.

Short-range communications subsystem 124 provides for communication between wireless communication device 100 and different systems or devices, without the use of wireless network 200. For example, short-range communications subsystem 124 may include an infrared device and associated circuits and components for short-range communication. Examples of short-range communication standards include standards developed by the Infrared Data Association (IrDA), Bluetooth, and the 802.11 family of standards developed by the IEEE.

In use, a received signal such as a text message, an e-mail message, or web page download is processed by communication subsystem 104 and input to processor 102. Processor 102 then processes the received signal for output to touchscreen display 112 or alternatively to auxiliary I/O subsystem 116. A subscriber may also compose data items, such as e-mail messages, for example, using touchscreen display 112 and possibly auxiliary I/O subsystem 116. Auxiliary I/O subsystem 116 may include devices such as: a keyboard, such as, for example, a mechanical keyboard or a touch-sensitive keyboard, a mouse, track ball, infrared fingerprint detector, or a roller wheel with dynamic button pressing capability. A composed item may be transmitted over wireless network 200 through communication subsystem 104.

For voice communications, the overall operation of wireless communication device 100 is substantially similar, except that the received signals are output to speaker 120, and signals for transmission are generated by microphone 122. Alternative voice or audio I/O subsystems 116, such as a voice message recording subsystem, can also be implemented on the wireless communication device. Although voice or audio signal output is accomplished primarily through speaker 120, the touchscreen display can also be used to provide additional information such as the identity of a calling party, duration of a voice call, or other voice call related information.

Figure 2:
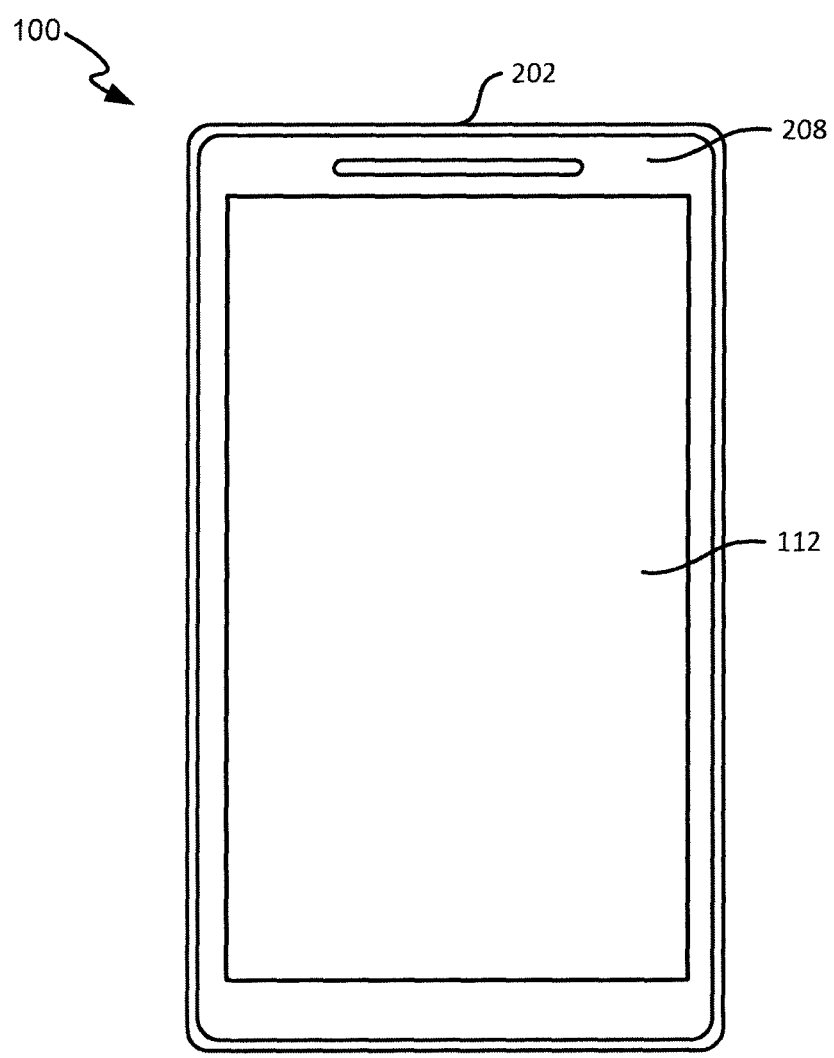
FIG. 2 is a front view of a wireless communication device in accordance with an example implementation of the present specification.

A front view of an example of wireless electronic device 100 is shown in FIG. 2. Wireless communication device 100 includes a body 202 that includes a back, sidewalls, and a front face 208. Touchscreen display 112 is disposed in body 202 and exposed at front face 208 for user-interaction.

Touchscreen display 112 may include a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

Figure 3:
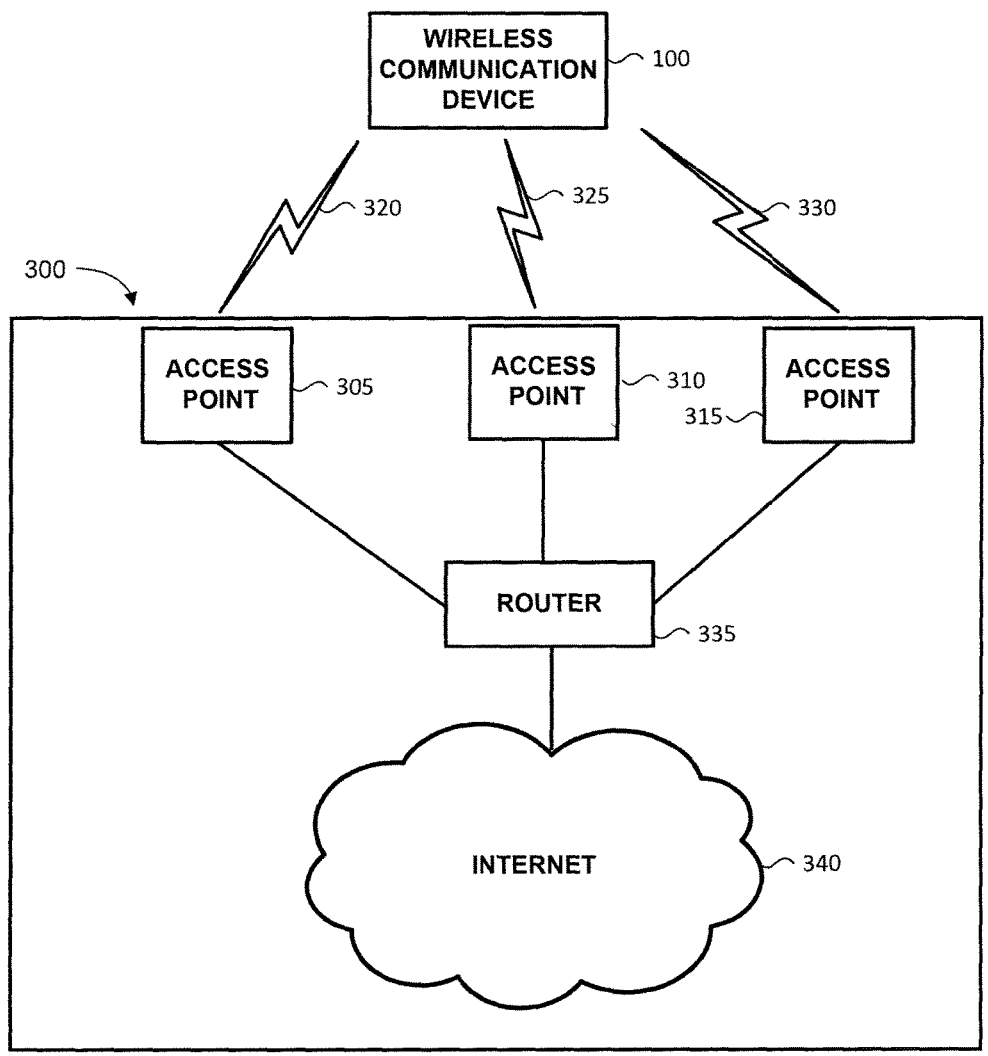
FIG. 3 is a block diagram of a wireless communication network which may communicate with wireless communication device of FIG. 1.

Reference is now made to FIG. 3, which illustrates a block diagram of an example implementation of a wireless communication network that is included in wireless network 200. In the example implementation shown in FIG. 3, wireless communication network is a wireless local area network (WLAN) 300 operating in accordance with IEEE 802.11 standards. WLAN 300 may be a private communication network of an enterprise (e.g. an organization, a company, a corporation, etc.) or a public WiFi™ network and operates in accordance with IEEE 802.11 standards.

WLAN 300 includes three wireless access points (APs) 305, 310, 315 that wirelessly communicate with wireless communication device 100 over wireless links 320, 325, 330. Each wireless AP 305, 310, 315 sends communication signals, such as radio frequency (RF signals), to and receives communication signals from the wireless communication device 100 via antenna 103 and WNIC 105. Although WLAN 300 of FIG. 3 includes three wireless APs, WLAN 300 may include other suitable numbers of wireless APs. Each wireless AP 305, 310, 315 is connected to a router 335 which is connected to the Internet 340. Wireless communication device 100 is configured to automatically discover, associate with, and establish communication with wireless APs 305, 310, 315. Wireless communication device 100 identifies WLAN 300 with use of a wireless network identifier which is communicated from WLAN 300. The wireless network identifier may be, for example, a Set Service Identifier (SSID) or Extended SSID (ESSID).

When wireless communication device 100 is operating in wireless network 200 and is communicating with WLAN 300 via one of wireless APs 305, 310, 315, the router 335 may be configured to allow or deny access to the data, applications, and/or functionality, as well as to allow or deny external access outside of WLAN 300 to Internet 340. Router 335 may include a set of IP address filters which define a set of addresses that are permissible/impermissible, if any at all, for access by wireless communication device 100. Access by wireless communication device 100 depends on whether or not wireless communication device 100 has been authorized and what access rights are given upon authorization.

For example, when wireless communication device 100 is operating in WLAN 300 of wireless network 200, wireless communication device 100 sends a request via an AP 305, 310, 315 to router 335, without first obtaining proper authorization. Router 335 is configured to receive the request and to respond to wireless communication device 100 to provide data for producing information (e.g. Web page information) which is rendered on touchscreen display 112 of wireless communication device 100 via a Web browser application. The information may solicit a response from a user. For example, the information may solicit a user to register or login with user fields for entering a user name and/or password information. Router 335 identifies whether the received user response is sufficient (e.g. whether the user name and password match pre-stored user name and password information, whether the user payment is accepted, whether the user acceptance is confirmed, etc.). If the user response is deemed sufficient, router 335 allows access to the data, applications, and/or functionality in or outside of wireless network 300.

WLAN 300 may provide or allow wireless communication device 100 to access various data and communication services. For example, WLAN 300 may provide for communication access to Internet 340 via the Web browser application, or voice telephony communication service with use of Voice over IP (VoIP) communication, or other communication services. For "push-type" data or message synchronization services, for example, wireless communication device 100 may be enabled to maintain data synchronization with a server (not shown) of WLAN 300 for user data of an application associated with a user account. The application of wireless communication device 100 and the server may be or include, for example, an electronic mail (e-mail) application program for the communication of e-mail messages.

Figure 4:
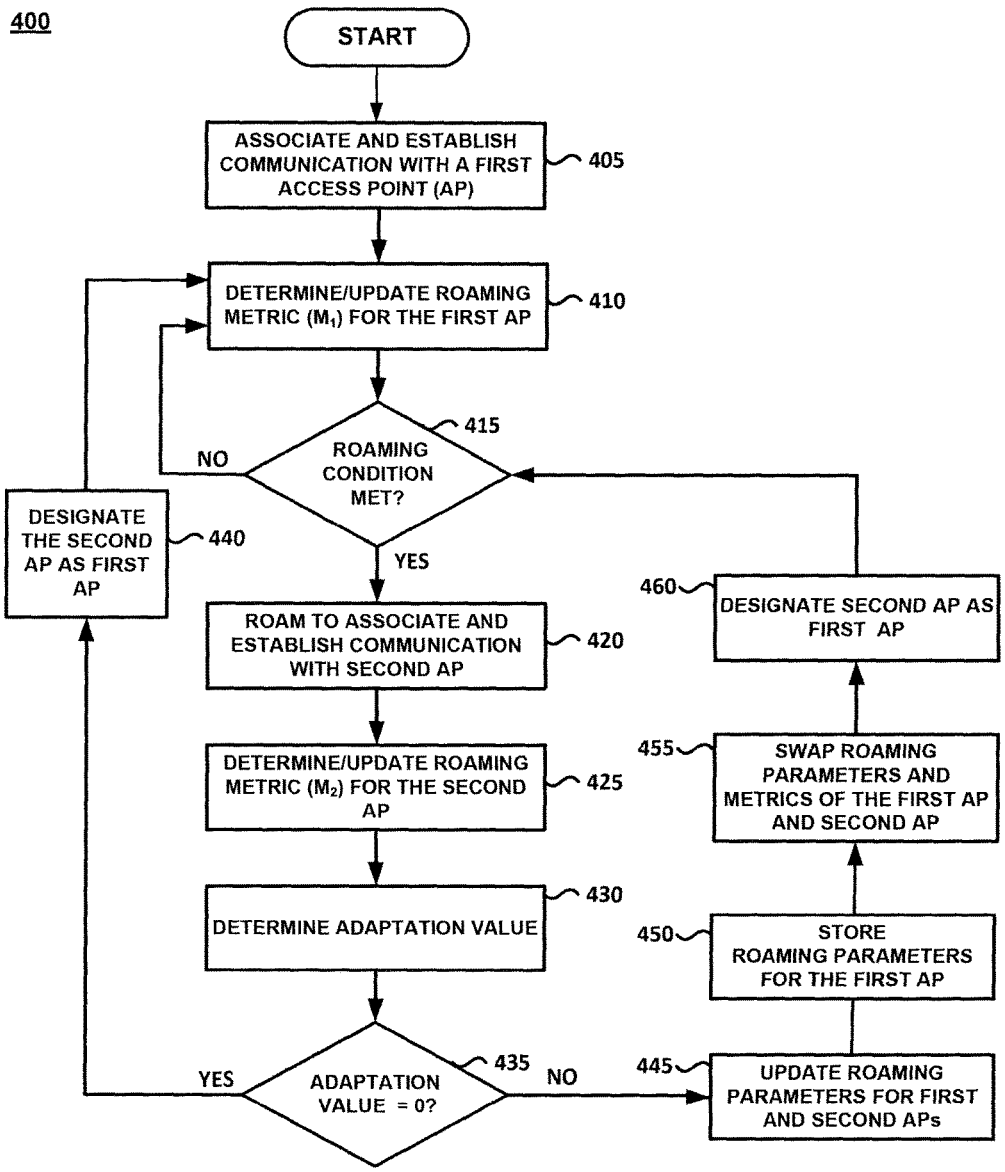
FIG. 4 is a flowchart of a method of controlling a wireless communication device operating in a wireless communication network in accordance with an example implementation of the present specification.

Reference is now made to FIG. 4 to describe an example implementation of a method 400 of controlling wireless communication device 100 to dynamically adapt and update roaming parameters stored in wireless communication device 100 when operating in wireless network 200 that includes WLAN 300. In this example implementation, wireless communication device 100 stores, in memory 110, default values for roaming parameters for each wireless AP in WLAN 300 within which wireless communication device 100 operates. The roaming parameters include a roam trigger parameter and roam delta parameter for each AP in a WLAN 300. The default values for the roam trigger and roam delta parameters may be set by a manufacturer or an administrator of wireless communication device 100.

Method 400 may be carried out by routines or subroutines of software executed by processor 102. Coding of software for carrying out such steps is well within the scope of a person of ordinary skilled in the art having regard to the present specification. Method 400 may contain additional or fewer processes than shown and described, and may be performed in a different order. Computer-readable code executable by, for example, processor 102 of the wireless communication device 100 to perform method 400, may be stored in a computer-readable medium.

Regardless, it is to be emphasized, that method 400 of FIG. 4 need not be performed in the exact sequence as shown, unless otherwise indicated; and likewise various blocks may be performed in parallel rather than in sequence; hence the elements of method 400 of FIG. 4 are referred to herein as "blocks" rather than "steps". It is also to be understood, however, that method 400 of FIG. 4 can be implemented on variations of device 100 as well.

Method 400 begins at block 405 where wireless communication device 100 monitors the RF signals received from wireless APs 305, 310, 315 in WLAN 300, determines a radio signal strength indicator (RSSI) value for the RF signals from each wireless AP 305, 310, 315, and associates with and establishes communication with the wireless AP 305, 310, 315 that has the highest radio signal strength indicator (RSSI) value. For the purpose of the present example implementation, the wireless communication device 100 first associates and communicates with wireless AP 305, which is designated as a first wireless AP.

After the wireless communication device 100 is associated, and in communication, with first wireless AP 305 at block 405, a first roaming metric ($M_1$) for first wireless AP 305 is determined at block 410. First roaming metric ($M_1$) is then determined at block 415 by: (1) measuring, for a pre-selected time period, a discrete set of samples of a radio signal strength indicator (RRSI) value for a wireless signal received from the first wireless AP 305; (2) measuring for the pre-selected time period, a discrete set of samples of an in-phase and quadrature (IQ) noise value for the wireless signal received from the first wireless AP 305; (3) determining an average value for the RSSI and the IQ noise from the discrete set of samples captured over the pre-selected time period; (4) repeating (1) to (3) a pre-selected number of times to obtain the average of a pre-selected number of observations or realizations of the average RSSI value and of the average IQ noise value; and (5) combining the double averaged RSSI value and the double averaged IQ noise value using a predetermined factor $\alpha$.

In other words, first roaming metric ($M_1$) is determined as follows:

$$M_1 = \frac{1}{N_w}\sum_{N_w}\left[\frac{1}{N_t}\sum_{N_t} \alpha \times \text{Normalized } IQ \text{ noise}(w, t) + (1-\alpha) \times \text{Normalized } RSSI(w, t)\right] \quad (1)$$

where $0 \leq \alpha \leq 1$, $N_t$ is the number of discrete measurements over the pre-selected time period, $N_w$ is the number of pre-selected observations or realizations, and the notation (w,t) designates the discrete time sample index t and the realization number index w of each measurement.

The Normalized IQ noise (w,t) is determined in (1) as follows:

$$\text{Normalized } IQ \text{ noise}(w, t) = \frac{IQ \text{ noise}(w, t) - IQ \text{ noise}(w, t)_{min}}{IQ \text{ noise}(w, t)_{max} - IQ \text{ noise}(w, t)_{min}} \quad (2)$$

The Normalized RSSI(w,t) is determined in (1) as follows:

$$\text{Normalize } RSSInoise(w, t)_{min} = \frac{RSSI(w, t) - RSSI_{min}}{RSSI_{max} - RSSI_{min}} \quad (3)$$

After determining first roaming metric (M1) at block 410, a determination is made whether wireless communication device 100 has roamed to another wireless AP 310, 315. Wireless communication device 100 is determined to have roamed to another wireless AP, such as, for example, wireless AP 310 (referred to herein as a second wireless AP) when a roaming condition is met at block 415. At block 415, the roaming condition is determined to be met when three distinct conditions are satisfied. That is, the roaming condition is determined to be met when: (1) the RSSI value for first wireless AP 305 is less than or equal to a scan trigger threshold value (i.e., a pre-selected threshold value that triggers wireless communication device 100 performs a scan for available APs in the wireless communications network 300); (2) the RSSI value for first wireless AP 305 is less than the value of the roam trigger parameter for first wireless AP 305 retrieved from memory 110; and (3) a RSSI value for a second wireless AP 310 in WLAN 300 is greater than the sum of the RSSI value of first wireless AP 305 and the value of the roam delta parameter retrieved from memory 110 for first wireless AP 305.

If the roaming condition is determined not to be met at block 415, the method 400 returns to block 410 and first roaming metric $M_1$ is periodically re-determined or updated. Optionally, first roaming metric $M_1$ may be re-determined or updated by combining the recalculated or updated first roaming metric $M_{1t1}$ with a previously determined first roaming metric $M_{1t0}$ using a forgetting factor f as follows:

$$M_1 = \frac{1}{N_w} \sum_{N_w} \left[ f \times \frac{1}{N_{t1}} \sum_{N_{t1}} M_1(w, t) + (1-f) \times \frac{1}{N_{t0}} \sum_{N_{t0}} M_1(w, t) \right] \quad (4)$$

However, if the roaming condition is determined to be met at block 415, the method 400 proceeds to block 420. At block 420, wireless communication device 100 roams to another wireless AP in WLAN 300, such as, for example, wireless AP 310. When wireless communication device 100 roams to wireless AP 310, wireless communication device 100 associates with and establishes communication with wireless AP 310.

After wireless communication device 100 is associated, and in communication, with the second wireless AP 310, the method proceeds to block 425 to determine a second roaming metric ($M_2$) for the second wireless AP 310. Second roaming metric ($M_2$) for the second wireless AP 310 is determined at block 425 by: (1) measuring, for a pre-selected time period, a discrete set of samples of a radio signal strength indicator (RSSI) value for a wireless signal received from the wireless AP 310; (2) measuring, for the pre-selected time period, a discrete set of samples of an in-phase and quadrature (IQ) noise value for the wireless signal received from the second wireless AP 310; and (3) determining an average value for the RSSI and the IQ noise from the discrete set of samples captured over the pre-selected time period. The measuring of the RSSI value and the IQ noise value for a pre-selected time period and the determining the average value for RSSI and IQ noise over the pre-selected time period is repeated a pre-selected number of times to obtain average values for the RSSI and the IQ noise, and these average values are combined using a predetermined constant.

In other words, second roaming metric ($M_2$) is determined as follows:

$$M_2 = \frac{1}{N_w} \sum_{N_w} \left[ \frac{1}{N_t} \sum_{N_t} \alpha \times \text{Normalized } IQ \text{ noise}(w, t) + \right. \quad (5)$$

$$\left. (1 - \alpha) \times \text{Normalized } RSSI(w, t) \right]$$

where $0 \le \alpha \le 1$, $N_t$ is the number of discrete measurements over the pre-selected time period, $N_w$ is the number of pre-selected observations or realizations, and the notation (w,t) designates the discrete time sample index t and the realization number index w of each measurement.

The Normalized IQ noise(w,t) for wireless AP 310 is determined in (4) as follows:

$$\text{Normalized } IQ \text{ noise}(w, t) = \frac{IQ \text{ noise}(w, t) - IQ \text{ noise}(w, t)_{min}}{IQ \text{ noise}(w, t)_{max} - IQ \text{ noise}(w, t)_{min}} \quad (6)$$

The Normalized RSSI(w,t) for wireless AP 310 is determined in (4) as follows:

$$\text{Normalize } RSSInoise(w, t)_{min} = \frac{RSSI(w, t) - RSSI_{min}}{RSSI_{max} - RSSI_{min}} \quad (7)$$

After second roaming metric ($M_2$) is determined at block 425, the method 400 proceeds to block 430 where an adaptation value $\Delta$ is determined. Adaptation value $\Delta$ is determined as follows:

$$\Delta = M_1 - M_2 \quad (7)$$

After adaptation value $\Delta$ is determined at block 430, method 400 proceeds to block 435 to determine whether adaptation value $\Delta$ is equal to zero. When adaptation value $\Delta$ is determined to not equal to zero at block 435, method 400 proceeds to block 445 to update the roaming trigger and roam delta parameters for first wireless AP 305 and the roaming trigger and roam delta parameters for second wireless AP 310. The roam delta parameter for first wireless AP 305 is updated at block 445 by setting the roam delta parameter for first wireless AP 305 to a difference between the RRSI of first wireless AP 305 and the RSSI of second wireless AP 310. The roam delta parameter for second wireless AP 310 is updated at block 445 by setting the roam delta parameter for second wireless AP 310 to a negative value of the roam delta parameter for first wireless AP 305. For example, if the roam delta parameter for first wireless AP 305 is +10 dBM, then the roam delta parameter for second wireless AP 310 is set to −10 dBm. Alternatively, if, for example, the roam delta parameter for first wireless AP 305 is −10 dBM, then the roam delta parameter for second wireless AP 310 is set to +10 dBm.

After the roam delta parameters are updated at block 445, method 400 proceeds to block 450 to store the updated first roaming metric ($M_1$) for first wireless AP 305, the updated second roaming metric ($M_2$) for second wireless AP 310, the updated roam delta and roam trigger parameters for first wireless AP 305, and the updated roam delta and roam trigger parameters for second wireless AP 310. Method 400 then proceeds to block 455 where the roam trigger parameter, the roam delta parameter, and the first roaming metric ($M_1$) for first wireless AP 305 are swapped with the roam trigger parameter, the roam delta parameter, and the second roaming metric ($M_2$) for second wireless AP 310, respectively. Method 400 then proceeds to block 460 where second wireless AP 310 is designated as first wireless AP. After designating second wireless AP 310 as the first wireless AP, method 400 returns to 415 to determine whether a roaming condition for first wireless AP (which is now wireless AP 310) is met. If the roaming condition for first wireless AP 310 is met, wireless communication device 100 roams to another wireless AP in WLAN 300, such as, for example, wireless AP 305 or wireless AP 315 in the present implementation. After roaming to wireless AP 315, for example, wireless communication device 100 associates, and establishes communication, with wireless AP 315. Wireless communication device 100 also designates wireless AP 315 as the second wireless AP. Method 400 then repeats blocks 425 through 460.

Optionally, when wireless communication device 100 is associated and in communication with second wireless AP 310, and the roaming condition for second wireless AP 310 is not met at block 415, the second roaming metric $M_2$ for second wireless AP 310 may be periodically updated by re-determining the second roaming metric $M_2$ by combining the re-determined second roaming metric $M_{2t1}$ with a previously determined second roaming metric $M_{2t0}$ using a forgetting factor f as follows:

$$M_1 = \frac{1}{N_w} \sum_{N_w} \left[ f \times \frac{1}{N_{t1}} \sum_{N_{t1}} M_2(w, t) + (1 - f) \times \frac{1}{N_{t0}} \sum_{N_{t0}} M_2(w, t) \right] \quad (4)$$

When the adaptation value Δ is determined to equal to zero at block 435, the method proceeds to block 440 where the wireless AP 310 is designated as the first wireless AP (now first wireless AP 310). After the second wireless AP 310 is designated as the first wireless AP at block 440, method 400 returns to block 410 and blocks 410 through 460 are repeated.

Referring now to FIGS. 5A and 5B, tables illustrating the results for an example of method 400 of the present specification implemented on wireless communication device 100 operating in wireless network 200. In the present example, wireless network 200 includes an LTE base station operating in band 7 and two symmetrically designed wireless APs that are operating on WiFi™ channels 1 and 13. When wireless communication device 100 is operating on the lowest channels of LTE bands, the proximity of the latter spectrum to higher WiFi™ channels 13 causes degradation of the data throughput in the downlink direction of the device. In the present example, the default roaming trigger parameter is set to −70 dBm, the default roaming delta parameter is set to 10 dB, α is set to 0.25, and the forgetting factor (f) is set to 0.5.

In the example shown in FIG. 5A, the cellular radio of wireless communication device 100 is turned off. The two channels are behaving in the same way and the method converges to a stable solution. From the table shown in FIG. 5A, the optimal roaming trigger parameter for the first wireless AP is −70 dBm, the optimal roaming delta parameter for the first wireless AP is 10 dB, and the optimal roaming scan trigger threshold value for the first wireless AP is −70.4 dBm. Also, from the table shown in FIG. 5A, the optimal roaming trigger parameter for second wireless AP is −70 dBm, the optimal roaming delta parameter for second wireless AP is 10 dB, the optimal roaming scan trigger threshold value for second wireless AP is −70.4 dBm.

In the example shown in FIG. 5B, the cellular radio of wireless communication device 100 is on and wireless communication device 100 is transmitting and receiving LTE data traffic from the LTE base station. The method of the present specification converges to non-symmetric roaming parameters, which are, as shown in FIG. 5B: −70 dBm for the roam trigger parameter of first wireless AP; −0.7 dB for the roam delta parameter of first wireless AP; −76.4 dBm for the roam scan parameter of first wireless AP; −60 dBm for the roam trigger parameter of second wireless AP; 0 dB for the roam delta parameter of second wireless AP; and −61.4 dBm for the roam scan trigger threshold value of second wireless AP.

Method 400 of the present specification mitigates interference when wireless communication device 100 is operating in a noisy wireless network 200, thereby increasing the data transfer rate over a wireless communication link between wireless communication device 100 and the APs 305, 310, 315 of a wireless communications network. Further, method 400 of the present specification maximizes the data throughput of a wireless communication link between wireless communication device 100 and the APs 305, 310, 315 by dynamically adapting the roaming parameters in the presence of a changing network environment.

Although method 400 described in the present specification relates to wireless communication device 100 operating in WLAN 300, method 400 can be implemented in wireless communication devices operating in any suitable wireless networks which allows wireless communication devices to roam between APs of the wireless networks, such as, for example cellular networks, and dual-mode networks.

Those skilled in the art will appreciate that in some implementations, the functionality of wireless communication device 100 can be implemented using pre-programmed hardware or firmware elements (e.g., application specific integrated circuits (ASICs), electrically erasable programmable read-only memories (EEPROMs), etc.), or other related components. In other implementations, the functionality of wireless communication device 100 can be achieved using a computing apparatus that has access to a code memory (not depicted) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the specification of this patent document contains material which is subject to copyright protection. The copyright owner has no objection to the facsimile reproduction by any one of the patent document or patent specification, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A wireless communication device, comprising:
an antenna;
a wireless network interface controller (WNIC) coupled to the antenna to exchange data, via the antenna, with a wireless local area network (WLAN) comprising a plurality of access points (APs) each configured to employ at least one of a plurality of predefined channels;
a memory storing, for each of the plurality of APs, a roaming parameter set corresponding to one of the channels employed by the AP;
a processor operably connected to the WNIC and the memory, the processor configured to:
responsive to establishing a connection with a first one of the APs employing a first one of the channels, generate a first roaming metric corresponding to the first AP using received signal strength indicator (RSSI) measurements and noise measurements derived from a set of samples of a wireless signal received from the first AP, the first roaming metric indicating a first level of interference detected by the WNIC on the first channel;
based on a first RSSI corresponding to the first AP, a second RSSI corresponding to a second AP employing a second one of the channels, and a first roaming parameter set corresponding to the first AP, initiate roaming from the first AP to establish a connection with the second AP;
generate a second roaming metric corresponding to the second AP, the second roaming metric indicating a second level of interference detected by the WNIC on the second channel that is smaller than the first level of interference;
update a second roaming parameter set to impede a subsequent roaming initiation from the second AP to the first AP; and
store the updated second roaming parameter set;
wherein the first roaming parameter set includes a first roaming delta parameter and a first roaming trigger parameter;
the processor further configured to update the first roaming parameter set by applying at least one of:
a decrease to the first roaming delta parameter; and
an increase to the first roaming trigger parameter;
the processor further configured to:
update the first roaming delta parameter based on a difference between the first RSSI and the second RSSI; and
update the first roaming trigger parameter based on a second roaming trigger parameter of a second roaming parameter set stored in the memory corresponding to the second AP, the second roaming trigger parameter decremented according to a difference between the first and second roaming metrics.

2. The wireless communication device of claim 1, the processor further configured to update the first roaming parameter set to accelerate a subsequent roaming initiation from the first AP to the second AP.

3. The wireless communication device of claim 1, the processor further configured to
update a second roaming delta parameter of the second roaming parameter set based on a difference between the second RSSI and the first RSSI; and
update a second roaming trigger parameter based on a first roaming trigger parameter, the first roaming trigger parameter incremented according to a difference between the first and second roaming metrics.

4. The wireless communication device of claim 1, the processor further configured to:
responsive to establishing subsequent connections with the first AP and initiating subsequent roaming to the second AP, repeat the updating of the second roaming parameter set until subsequent first and second roaming metrics are equal.

5. A method in a wireless communication device having an antenna and a wireless network interface controller (WNIC) coupled to the antenna to exchange data, via the antenna, with a wireless local area network (WLAN) comprising a plurality of access points (APs) each configured to employ at least one of a plurality of predefined channels, the method comprising:
storing in a memory, for each of the plurality of APs, a roaming parameter set corresponding to one of the channels employed by the AP;
at a processor operably connected to the WNIC and the memory:
responsive to establishing a connection with a first one of the APs employing a first one of the channels, generate a first roaming metric corresponding to the first AP using received signal strength indicator (RSSI) measurements and noise measurements derived from a set of samples of a wireless signal received from the first AP, the first roaming metric indicating a first level of interference detected by the WNIC on the first channel;
based on a first RSSI corresponding to the first AP, a second RSSI corresponding to a second AP employing a second one of the channels, and a first roaming parameter set corresponding to the first AP, initiating roaming from the first AP to establish a connection with the second AP;
generating a second roaming metric corresponding to the second AP, the second roaming metric indicating a second level of interference detected by the WNIC on the second channel that is smaller than the first level of interference;
updating a second roaming parameter set to impede a subsequent roaming initiation from the second AP to the first AP; and
storing the updated second roaming parameter set;
wherein the first roaming parameter set includes a first roaming delta parameter and a first roaming trigger parameter;
the method further comprising updating the first roaming parameter set by applying at least one of:
a decrease to the first roaming delta parameter; and
an increase to the first roaming trigger parameter;
wherein updating the first roaming parameter set further comprises:
updating the first roaming delta parameter based on a difference between the first RSSI and the second RSSI; and
updating the first roaming trigger parameter based on a second roaming trigger parameter of a second roaming parameter set stored in the memory corresponding to the second AP, the second roaming trigger parameter decremented according to a difference between the first and second roaming metrics.

6. The method of claim 5, further comprising: updating the first roaming parameter set to accelerate a subsequent roaming initiation from the first AP to the second AP.

7. The method of claim 5, wherein updating the second roaming parameter set comprises:
updating a second roaming delta parameter of the second roaming parameter set based on a difference between the second RSSI and the first RSSI; and
updating the second roaming trigger parameter based on a first roaming trigger parameter, the first roaming trigger parameter incremented according to a difference between the first and second roaming metrics.

8. The method of claim 5, further comprising:
responsive to establishing subsequent connections with the first AP and initiating subsequent roaming to the second AP, repeating the updating of the second roaming parameter set until subsequent first and second roaming metrics are equal.

9. A non-transitory computer-readable medium storing computer-readable instructions executable by a processor of a wireless communication device having (i) an antenna and (ii) a wireless network interface controller (WNIC) coupled to the antenna to exchange data, via the antenna, with a wireless local area network (WLAN) comprising a plurality of access points (APs) each configured to employ at least one of a plurality of predefined channels, for causing the processor to perform a method comprising:
storing in a memory, for each of the plurality of APs, a roaming parameter set corresponding to one of the channels employed by the AP;
at a processor operably connected to the WNIC and the memory:
responsive to establishing a connection with a first one of the APs employing a first one of the channels, generating a first roaming metric corresponding to the first AP using received signal strength indicator (RSSI) measurements and noise measurements derived from a set of samples of a wireless signal received from the first AP, the first roaming metric indicating a first level of interference detected by the WNIC on the first channel;
based on a first RSSI corresponding to the first AP, a second RSSI corresponding to a second AP employing a second one of the channels, and a first roaming parameter set corresponding to the first AP, initiating roaming from the first AP to establish a connection with the second AP;
generating a second roaming metric corresponding to the second AP, the second roaming metric indicating a second level of interference detected by the WNIC on the second channel that is smaller than the first level of interference;
updating a second roaming parameter set to impede a subsequent roaming initiation from the second AP to the first AP; and
storing the updated second roaming parameter set in the memory;
wherein the first roaming parameter set includes a first roaming delta parameter and a first roaming trigger parameter;
the method further comprising updating the first roaming parameter set by applying at least one of:
a decrease to the first roaming delta parameter; and
an increase to the first roaming trigger parameter;
wherein updating the first roaming parameter set further comprises:
updating the first roaming delta parameter based on a difference between the first RSSI and the second RSSI; and
updating the first roaming trigger parameter based on a second roaming trigger parameter of a second roaming parameter set stored in the memory corresponding to the second AP, the second roaming trigger parameter decremented according to a difference between the first and second roaming metrics.

10. The non-transitory computer-readable medium of claim 9, the method further comprising: updating the first roaming parameter set to accelerate a subsequent roaming initiation from the first AP to the second AP.

11. The non-transitory computer-readable medium of claim 9, wherein updating the second roaming parameter set comprises:
updating a second roaming delta parameter of the second roaming parameter set based on a difference between the second RSSI and the first RSSI; and
updating the second roaming trigger parameter based on a first roaming trigger parameter, the first roaming trigger parameter incremented according to a difference between the first and second roaming metrics.

12. The non-transitory computer-readable medium of claim 9, the method further comprising:
responsive to establishing subsequent connections with the first AP and initiating subsequent roaming to the second AP, repeating the updating of the second roaming parameter set until subsequent first and second roaming metrics are equal.

* * * * *